United States Patent Office 3,732,305
Patented May 8, 1973

3,732,305
S-SUBSTITUTED THIOSULFURIC ACID DERIVATIVES AND PREPARATION THEREOF
Ludwig Bauer, Wilmette, Ill., assignor to the United States of America as represented by the Secretary of the Army
No Drawing. Filed Mar. 3, 1970, Ser. No. 16,240
Int. Cl. C07c *129/00*
U.S. Cl. 260—564 R                          1 Claim

ABSTRACT OF THE DISCLOSURE

This invention relates to antiradiation compounds comprising a molecule which includes a component with antiradiation properties linked to a component with substantial lipid solubility. There are also described seven new compounds, illustrative of this new type of antiradiation compound. The seven compounds are S-[(N-substituted carboxamidinium)methyl] thiosulfuric acids (Bunte salts) having the general formula $^-O_3SSCH_2C(=NH_2+)NHR$ and hydrolysis products thereof, wherein R represents bi- and tricyclic aliphatic ring systems. The compounds have demonstrated utility as antiradiation agents.

---

The invention herein described was made in the course of or under a contract or subcontract thereunder with the Department of the Army.

BACKGROUND OF THE INVENTION (1) Field of the invention

This invention relates to the field of antiradiation compounds and more specifically to the field of antiradiation compounds comprising a molecule which includes a component with antiradiation properties linked to a component with substantial lipid solubility. This invention also relates to the field of S-[(N-substituted carboxamidinium)methyl] thiosulfuric acids (Bunte salts) and hydrolysis products thereof which are effective antiradiation compounds.

(2) Description of the prior art

The search for antiradiation agents has been prompted by the need to provide biological systems with a chemical means of minimizing the destructive effects of ionizing radiation. As human activity increases in areas of potential radiation hazard, the development of antiradiation agents becomes progressively more important. The threat of nuclear warfare has further motivated the search for suitable antiradiation compounds to protect the population from the destructive effects of radiation.

The field of antiradiation compounds opened with the discovery of Patt et al. in 1949 that mice could be protected by cysteine against otherwise lethal doses of radiation by X-rays. See H. Patt et al., Science, 110: 213 (1949) and H. Patt et al., Proc. Soc. Exp. Biol. Med., 73: 18 (1950). In 1951, it was shown that both 2-mercaptoethylamine and 3-mercaptopropylamine are more effective radioprotective agents than cysteine. See Z. Bacq et al., Arch. Intern. Physiol., 59: 442 (1951). A large number of analogs and functional derivatives of the above amino thiols have since been tested for this activity. See A. Pihl et al., Pharmacol. Rev., 10: 437 (1958). The size of the research effort seen in the prior art reflects the recognized importance of developing effective radiation-protective substances.

The prior art shows that a number of S-[(N-substituted carboxamidinium)methyl] thiosulfuric acids (Bunte salts), $^-O_3SSCH_2C(=NH_2+)NHX$, where X=alkyl or arylalkylene, are promising radiation-protective compounds in mice' See L. Bauer and T. Welsh, J. Org. Chem. 27: 4382 (1962) and L. Bauer and K. Sandberg, J. Med. Chem. 7: 766 (1964). A problem with the S-substituted thiosulfuric acid derivatives (also called Bunte salts) has been poor lipid solubility and poor transport through living biological systems.

SUMMARY OF THE INVENTION

This invention provides antiradiation compounds comprising a molecule including a component with antiradiation properties linked to a component with substantial lipid solubility.

This invention also provides a series of S-[(N-substituted carboxamidinium)methyl] thiosulfuric acid (Bunte salts) and hydrolysis products thereof, having the general formula $^-O_3SSCH_2C(=NH_2+)NHR$ wherein R represents bi- and tricyclic aliphatic ring systems. This invention also provides a method for preventing the destructive effects of ionizing radiation comprising the administration of a compound with an antiradiation component linked to a component with substantial lipid solubility.

Accordingly, it is an object of this invention to provide new compounds which are useful as antiradiation agents.

Another object of this invention is to provide antiradiation agents which have increased lipid solubility and increased transportability through living biological systems.

A further object of this invention is to provide compounds that are S-[(N-substituted carboxamidinium)methyl] thiosulfuric acids and hydrolysis products thereof, having the general formula $$^-O_3SSCH_2C(=NH_2+)NHR$$

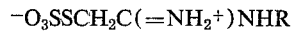

wherein R represents bi- and tricyclic aliphatic ring systems.

Finally, it is an object of this invention to provide effective antiradiation compounds with long-lasting protection which are S-[(N-substituted carboxamidinium)methyl] thiosulfuric acids and hydrolysis products thereof, having the general formula $$^-O_3SSCH_2C(=NH_2+)NHR_1$$

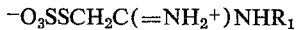

wherein $R_1$ represents terpenoid and adamantane substituents.

DESCRIPTION OF THE PREFERRED EMBODIMENTS

This invention comprises modifying the polar character of S-[(N-substituted carboxamidinium)methyl] thiosulfuric acids and hydrolysis products thereof, by introducing highly condensed aliphatic systems into the molecule. By attaching bi- and tricyclic aliphatic ring systems to the amidine function of S-[(N-substituted carboxamidinium)methyl] thiosulfates, additional lip solubility and increased transport through living biological systems is faciltated By imparting additional lipid solubility and facilitating transport through living biologcal systems, more effectve radiation protection is achieved.

S-substituted thiosulfuric acid derivatives which have protective effects against otherwise lethal doses of ionizing radiation presumably have this property due to the in vivo conversion of the —$S_2O_3H$ function to the —SH function. This hypothesis appears reasonable since the antiradiation evaluation results reports below indicate that the thiosulfuric acid form and the mercapto form of the example compounds both exhibit protective effects, and are therefore functionally equivalent from the standpoint of empirical results after administration.

The examples presented below are illustrative but not exhaustive of the present invention. Each of the compounds synthesized is an active antiradiation compound comprising a component with antiradiation properties linked to a component with substantial lipid solubility, thus achieving an antiradiation compound which has increased lipid solubility.

Therefore, the following compounds are presented as illustrations of the present invention:

EXAMPLE 1

Preparation of S-[N-(exo-2-norbornyl)carboxamidinomethyl]thiosulfuric acid

The first step in the preparation of this product was to prepare the intermediate, exo-2-norbornylamine hydrochloride. The procedure to prepare this amine intermediate was adapted from the method of H. Brown et al., J. Am. Chem. Soc., 86: 3565 (1964), except that hydroboration of norbornylene (commercially available) was accomplished by generating diborane in situ according to G. Zweifel et al., Organic Reactions, vol. 13, Ch. 1 (1963). The hydrochloride was obtained by adding a slight excess of concentrated HCl to a solution of the free base in methanol, followed by evaporation to dryness. The yield of the intermediate was 25%. Proton magnetic resonance (p.m.r.) spectra were recorded using tetramethylsilane and sodium 3-(trimethylsilyl) - 1 - propanesulfonate as internal standards in organic and aqueous media, respectively. Chemical shifts were recorded in p.p.m. ($\delta$) downfield from these internal references and multiplicities are indicated by the usual abbreviations. The p.m.r. (in $D_2O$) results on the intermediate compound were as follows: $\delta$ 3.29 (m, 1, endo H), 2.44 (broad s, 2, bridgehead H), 0.97–2.12 (m, 8, methylene H). The p.m.r. spectrum of commercial 2-norbonylamine hydrochloride ($D_2O$) was as follows: $\delta$ 3.63 (m, 1, exo H), 2.42 (m, 2, bridgehead H), 0.87–2.17 (m, 8, methylene H). Since the alpha-methine and bridgehead hydrogens showed distinct signals from those of the synthetic exo compound, it was concluded that the commercial material is the endo isomer. There was no indication that either sample was a mixture of isomers. The N-acetyl derivative of exo-2-norbornylamine hydrochloride was synthesized and it melted at 138–140° C., which compared favorably with the melting point of 139° C. reported by K. Alder in Ann., 514: 226 (1934).

The next step in the preparation of the desired end product was to prepare another intermediate, methyl alpha-chloroacetimidate. A solution of methyl alpha-chloroacetimidate was prepared by adding freshly distilled commercial chloroacetonitrile (1.6 gm., 0.021 mole) dropwise to a stirred solution of 20 ml. of 0.1 N methanolic sodium methoxide solution. The solution was stirred under anhydrous conditions at room temperature for 60 minutes at which time imidate formation appeared to be complete.

The next step was to add to the above solution 2.8 gm. of the intermediate exo-2-norbornylamine hydrochloride. The reaction mixture was stirred for 20 minutes and was then poured into a solution of 5.0 gm. of $$Na_2S_2O_3 \cdot 5H_2O$$

in 25 ml. of water. The final mixture was heated to boiling and then the methanol was largely evaporated. The mixture was twice filtered so that a light yellow solution free of dark tar was obtained. Nearly colorless solid began to crystallize from the aqueous filtrate within two hours. The product, S - [N - (exo - 2 - norbornyl)carboxamidinomethyl] thiosulfuric acid, was obtained in 28% yield and it darkened at 150° C., with decomposition at 168–170° C.

An elemental analysis gave the following results:
Analysis.—Calculated for $C_8H_{16}N_2O_3S_2$ (percent): C, 40.91; H, 6.10; N, 10.60; S, 24.23. Found (percent): C, 40.89; H, 6.07; N, 10.65; S, 24.40.

EXAMPLE 2

Preparation of S-[N-(endo-2-norbornyl)carboxamidomethyl]thiosulfuric acid

This product was prepared using the technique described for exo-2-norbornylamine in Example 1, but starting with endo-2-norbonylamine (commercially available) and converting it by the procedure used in Example 1 to S-[N-(endo-2 - norbornyl)carboxamidinomethane] thiosulfuric acid. The yield of end product after recrystallization was 27% and the product had a decomposition point of 165° C.

An elemental analysis gave the following results:
Analysis.—Calculated for $C_9H_{16}N_2O_3S_2$ (percent): C, 40.91; H, 6.10; N, 10.60; S, 24.23. Found (percent): C, 40.79; H, 6.30; N, 10.48; S, 24.09.

EXAMPLE 3

Preparation of S-[N-(endo-2-bornyl)carboxamidinomethyl] thiosulfuric acid

The first step in the preparation of the desired end product was to prepare the intermediate, methyl alpha-chloroacetimidate. A solution of methyl alpha-chloroacetimidate was prepared by adding freshly distilled commercial chloroacetonitrile (1.3 gm., 17.3 mmoles) dropwise to a stirred solution of 15 ml. of 0.1 N methanolic sodium methoxide solution. The solution was stirred under anhydrous conditions at room temperature for 30 minutes at which time imidate formation appeared to be complete.

The next step was to prepare a quantity of endo-2-bornylamine hydrochloride by passing HCl gas through a chilled solution of endo-2-bronylamine (commercially available) in dry ether. Next, 3.0 gm., (15.8 mmoles) of endo-2-bornylamine hydrochloride was added to the solution containing the methyl alpha-chloroacetimidate. The reaction mixture was stirred for 50 minutes and then 3.75 gm. of $Na_2S_2O_3 \cdot 5H_2O$ in 15 ml. of water was added in one amount. The deep pink color of the alpha-chloroamidine solution quickly gave way to a deep yellow mixture. After 10 minutes, the mixture was heated to boiling, treated with charcoal, and filtered. Solid soon began to separate from the light brown filtrate. Most of the methanol was evaporated and the remainder was left overnight. The light brown solid was then collected with water washing. Colorless material was obtained by dissolving the solid in a minimum amount of hot n-butanol. Ether was used to precipitate the pure end product, S-[N-(endo-2-bornyl)carboxamidinomethyl] thiosulfuric acid. This compound darkens at 152° C. and decomposition was complete at 168° C. The yield was 40%.

An elemental analysis gave the following results:
Analysis.—Calculated for $C_{12}H_{22}N_2O_3S_2$ (percent): C, 47.05; H, 7.24; N, 9.15; S, 20.89. Found (percent): C, 47.36; H, 7.10; N, 9.25; S, 21.02.

EXAMPLE 4

Preparation of S-[N-(endo-2-norbornylmethyl)carboxamidinomethyl] thiosulfuric acid The first step in the preparation of the desired end product was to prepare the intermediate, endo-2-norbornylmethylamine hydrochloride. A solution of 24 gm. of 2-norbornanecarbonitrile (commercially available) in 40 ml. of dry tetrahydrofuran was added during one hour to a stirred suspension of $LiAlH_4$ (7.6 gm.) in dry tetrahydrofuran (350 ml.) under a nitrogen atmosphere. The mixture was heated under reflux for one hour and cooled. The excess hydride was decomposed by the dropwise addition of 10 ml. of water and 30 ml. of 10% NaOH solution was added with vigorous stirring. The mixture was filtered and the filtrate was dried over anhydrous $Na_2SO_4$, decanted, and evaporated in vacuo at 40–50° C. The residual amine was dissolved in methanol and treated with a slight excess of concentrated HCl. Evaporation of the solvents in vacuo and recrystallization of the residue from 2-propanol gave 21.3 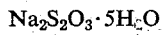 gm. (64% yield) of the desired intermediate, endo-2-norbanemethylamine hydrochloride. The N-benzoyl derivative was prepared directly from the hydrochloride using pyridine as the solvent and it melted at 99–101.5° C. J. Berson et al. in J. Am.

Chem. Soc.; 83: 3986 (1961) report the melting point at 99.5–101.5° C. The exo-N-benzoyl isomer reportedly has a melting point of 116–117° C., so it was concluded that the commercially available nitrile used for this reduction was the endo isomer.

The next step was to stir 1.2 gm. (16 mmole) of chloroacetonitrile into 15 ml. of a 0.1 N methanolic solution of sodium methoxide for 20 minutes and then add 2.4 gm. of the intermediate, endo-2-norbornanemethylamine hydrochloride. After stirring for 45 minutes, the methanol was evaporated to leave a light brown oil. After five minutes, the oil became dark and developed a purplish cast. Then 3.75 gm. (0.015 mole) of $Na_2S_2O_3 \cdot 5H_2O$ in 30 ml. of water added. The solution was filtered and 0.75 gm. (36% yield) of colorless crystals separated from the filtrate. The crystals were the desired end product, S-[-(endo - 2 - norbornylmethyl)carboxamidinomethyl] thiosulfuric acid, which began to color at 120° C. and finally melted with decomposition at 150–153° C.

An elemental analysis gave the following results:

*Analysis.*—Calculated for $C_{10}H_{18}N_2O_3S_2$ (percent): C, 43.16; H, 6.52; N, 10.07; S, 23.00. Found (percent): C, 43.21; H, 6.66; N, 10.21; S, 22.98.

EXAMPLE 5

Preparation of S-[N-(cis-2-myrtanyl)carboxamidinomethyl] thiosulfuric acid

The first step in the preparation of this product was to prepare the intermediate, cis-myrtanylamine. This amine was prepared by a combination of the literature procedures for hydroboration of (−)-beta-pinene taught by G. Zweifed et al. in Organic Reactions, vol. 13, Ch. 1 (1963) and amination of the resulting dialkylborane seen in H. Brown et al. in J. Am. Chem. Soc., 86: 3565 (1964). The yield was 15%. The free base had a boiling point of 60–70° C. at 2–3 mm. H. Brown et al., supra, report a boiling point of 60–61° C. at 2 mm. Proton magnetic resonance (in $CDCl_3$) gave δ 2.67 (broad d, 2, J=6.1 Hz, $CH_2N$), 1.25–2.50 (m, 9), 1.17 (S, 3, $CH_3$), 1.05 (S, NH), 0.97 (S, 3, $CH_3$). The N-benzoyl derivative had a melting point of 103.5–104.5° C. H. Brown et al., supra, report a melting point of 105–106° C. for this derivative.

The next step was to dissolve 3.0 gm. (0.02 mole) of the intermediate, cis-myrtanylamine, in absolute methanol. The solution was made acidic with concentrated HCl and the methanol was evaporated to dryness under reduced pressure to give colorless cis-myrtanylamine hydrochloride.

The next step was to mix 1.5 gm. (0.02 mole) of chloroacetonitrile with 20 ml. of 0.1 N methanolic sodium methoxide. After 20 minutes, it was shown by nuclear magnetic resonance (n.m.r.) that imidate formation was complete. Then 0.02 mole of cis-myrtanylamine hydrochloride dissolved in 20 ml. of methanol was poured in with swirling. The n.m.r. spectrum at 20 minutes showed no imidate peaks and 5 gm. of $Na_2S_2O_3 \cdot 5H_2O$ in 30 ml. of water was added. The mixture became cloudy and colorless solid began to deposit in less than five minutes. After 30 minutes, 4.0 gm. of colorless end product was collected and dryed over NaOH pellets. By evaporation of most of the methanol another 0.9 gm. of end product was obtained for a total yield of 80%. The product darkened at 150° C. and decomposed at 162–165° C.

An elemental analysis gave the following results:

*Analysis.*—Calculated for $C_{12}H_{22}N_2O_3S_2$ (percent): C, 47.05; H, 7.24, N, 9.15; S, 20.89. Found (percent): C, 47.44; H, 7.38; N, 9.45; S, 20.83.

EXAMPLE 6

Preparation of S-[N-(1-adamantylmethyl)carboxamidinomethyl] thiosulfuric acid

The first step in the preparation of this product was to prepare 1-adamantanemethylamine. A suspension of $LiAlH_4$ (4.2 gm., 0.11 mole) in 200 ml. of dry tetrahydrofuran was stirred in a nitrogen atmosphere and a solution of 16.1 gm. (0.1 mole) of 1-adamantanecarbonitrile (commerically available) in 45 ml. of dry tetrahydrofuran was added over a period of 30 minutes. The mixture was heated under reflux for 2½ hours, cooled, and treated dropwise with 15 ml. of water and then 25 ml. of 20% NaOH. The mixture was filtered, and the filtrate was dried over anhydrous $Na_2SO_4$, decanted, and evaporated in vacuo at 40–50° C. The residual was distilled to yield 11.6 gm. (70% yield) of 1-adamantanemethylamine, boiling point 95–97° C. at 4 mm. H stetter et al. in Chem. Ber., 96: 550 (1963) report a boiling point of 83–85° C. at 3 mm. Proton magnetic resonance (in $CDCl_3$) gave these results: δ 2.30 (s, 2, $CH_2$-N), 1.97 (broad s, 3, bridgehead H), 1.73 (6H), 1.47 (6H), 1.10 (s, NH). The N-benzoyl derivative had a melting point of 144–145° C. which compares to the melting point of 142° C. reported by H. Stetter et al., supra.

The next step was to convert 3.3 gm. (0.02 mole) of 1-adamantanemethylamine to the hydrochloride by treatment with excess concentrated HCl in methanol followed by evaporation of the solvent. Then 1.5 gm. (0.02 mole) of chloroacetonitrile was dissolved in 20 ml. of 0.1 N methanolic sodium methoxide solution and stirred for 25 minutes. 1-Adamantanemethylamine (2.8 gm.) was then added to the mixture and it was stirred for two hours at room temperature. Some of the intermediate, N-(1-adamantanemethyl)-alpha-chloroacetamidine hydrochloride, which had precipitated, was removed by filtration and the filtrate was diluted with 100 ml. of dry ether to yield more intermediate (total 3.9 gm., 70% yield), with a melting point of 274–276° C. The p.m.r. of the two samples was identical and the product was recrystallized from absolute ethanol. The p.m.r. (in $CF_3COOH$) results were: δ 4.38 (s, 2, $ClCH_2$), 3.13 (broad d, 2, J=5.0 Hz, $CH_2N$), 2.06 (broad d, 2, bridgehead H), 1.80, 1.67 (broad singlets, 12 total, methylene H).

An elemental analysis on this intermediate, N-(1-adamantonemethyl)-alpha-chloroacetamidine hydrochloride, gave these results:

*Analysis.*—Calculated for $C_{13}H_{22}Cl_2N_2$ (percent): C, 56.28; H, 7.97; N, 10.20. Found (percent): C, 56.50; H, 8.06; N, 10.27.

The next step in the preparation of the desired end product was to react the intermediate, N-(1-adamantanemethyl)-alpha-chloroacetamidine, with a solution of 5.0 gm. of $Na_2S_2O_3 \cdot 5H_2O$ in 25 ml. of water. After stirring for 10 minutes, the desired end product began to precipitate. The end product was collected after several hours with a total amount of 5.0 gm. (79% yield) being produced. It had a decomposition point of 175–179° C.

An elemental analysis gave these results:

*Analysis.*—Calculated for $C_{13}H_{22}N_2O_3S_2$ (percent): C, 49.05; H, 6.97; N, 8.80; S, 20.10. Found (percent): C, 49.36; H, 6.90; N, 8.89; S, 19.53.

EXAMPLE 7

Preparation of N-(1-adamantylmethyl)-alpha-mercaptoacetamidine hydrochloride

The first step in the preparation of this product was to prepare 1-adamantanemethylamine. A suspension of $LiAlH_4$ (4.2 gm., 0.11 mole)) in 200 ml. of dry tetrahydrofuran was stirred in a nitrogen atmosphere and a solution of 16.1 gm. (0.1 mole) of 1-adamantanecarbonitrile (commercially available) in 45 ml. of dry tetrahydrofuran was added over a period of 30 minutes. The mixture was heated under reflux for 2½ hours, cooled, and treated dropwise with 15 ml. of water and then 25 ml. of 20% NaOH. The mixture was filtered, and the filtrate was dried over anhydrous $Na_2SO_4$, decanted, and evaporated in vacuo at 40–50° C. The residual amine was distilled to yield 11.6 gm. (70% yield) of 1-adamantanemethylamine, boiling point 95–97° C. at 4 mm., H. Stetter et al. in Chem. Ber., 96: 550 (1963) report a boiling point of 83–85° C. at 3 mm. Proton magnetic resonance (in CDCl₃) gave these results: δ 2.30 (s, 2, CH₂–N), 1.97 (broad s, 3, bridgehead H), 1.73 (6H), 1.47 (6H), 1.10 (s, NH). The N-benzoyl derivative had a melting point of 144–145° C. which compares to the melting point of 142° C. reported by H. Stetter et al., supra.

The next step was to convert 3.3 gm. (0.02 mole) of 1-adamantanemethylamine to the hydrochloride by treatment with excess concentrated HCl in methanol followed by evaporation of the solvent. Then 1.5 gm. (0.02 mole) of chloroacetonitrile was dissolved in 20 ml. of 0.1 N methanolic sodium methoxide solution and stirred for 25 minutes. 1-Adamantanemethylamine (2.8 gm.) was then added to the mixture and it was stirred for two hours at room temperature. Some of the intermediate, N-(1-adamantonemethyl) - alpha - chloroacetamide hydrochloride, which had precipitated, was removed by filtration and the filtrate was diluted with 100 ml. of dry ether to yield more intermediate (total 3.9 gm., 70% yield), with a melting point of 274–276° C. The p.m.r. of the two samples was identical and the product was recrystallized from absolute ethanol. The p.m.r. (in CF₃COOH) results were: δ 4.38 (s, 2, ClCH₂), 3.13 (broad d, 2, J=5.0 HZ, CH₂N), 2.06 (broad d, 2, bridgehead H), 1.80, 1.67 (broad singlets, 12 total, methylene H).

An elemental analysis on this intermediate, N-(1-adamantanemethyl)-alpha-chloroacetamidine hydrochloride, gave these results:

*Analysis.*—Calculated for C₁₃H₂₂Cl₂N₂ (percent): C, 56.28; H, 7.97; N, 10.20. Found (percent): C, 56.50; H, 8.06; N, 10.27.

The next step was to add 5.54 gm. (0.02 mole) of the intermediate, N - (1 - adamantanemethyl)-alpha-chloroacetamidine hydrochloride to a solution of 4.0 gm. of Na₃SPO₃ in 60 ml. of water. The mixture was stirred vigorously for 30 minutes. The flask was then flushed with nitrogen, and 35 ml. of 6 N HCl and 30 ml. of 2-propanol were added. The mixture was stirred, heated to 80–90° C. for 20 minutes and then cooled. A 5.0 gm. quantity (91% yield) of the desired end product, N-(1-adamantylmethyl) - alpha-mercaptoacetamidine hydrochloride, was collected. The compound decomposed at 220.5–222.5° C. Recrystallization from water did not alter the decomposition range.

An elemental analysis gave the following results:
*Analysis.*—Calculated for C₁₃H₂₃ClN₂S (percent): C, 56.79; H, 8.43; N, 10.19; S, 11.66. Found (percent): C, 56.35; H, 8.36; N, 10.25; S, 11.04.

ANTIRADIATION EVALUATION METHOD

Female mice of the Walter Reed Bagg Swiss or inbred Charles River (ICR) strains, five to six weeks old and weighing 21–25 gm. were randomly assigned to treatment groups. Toxicity estimations were based on a 10-day observation period following intraperitoneal injections of each agent in graded doses. The maximum tolerated dose of each drug was administered 15–30 minutes before exposure to lethal whole-body irradiation.

The drugs, which were freshly prepared for administration prior to use, were, depending on their solubility, either dissolved in physiological saline soltuion or homogenized in a glass tissue grinder in a suspending medium of physiological saline solution containing 0.2% methylcellulose (4000 cp.) and 0.4% Tween-80. The suspensions were exposed to an ultrasonic apparatus for approximately two minutes to ensure uniform particle size. The pH range of the solutions or suspensions was adjusted to 6–7, if necessary.

Irradiation of the mice was performed utilizing either of two sources: 300-kvp. GE Maxitron unit, with radiation factors of 20 mA, hvl 2 mm. Cu, tsd 85 cm., dose rate in air 45 R/minutes or a specially designed ⁶⁰Co irradiator, which contained 1200 Ci of ⁶⁰Co, half above and half below the radiation chamber, with a dose rate range from 100–50 R/minutes over a 5-year period.

Forty mice were exposed in a perforated Lucite dish 50.8 cm. in diameter which rotated continuously during exposure. Equal numbers of control mice injected with only the vehicle used for the particular drug evaluation were irradiated simultaneously with each treated group and thereafter housed jointly eight to a cage.

The mice were given food and water ad libitum. The drinking water contained 10–15 p.p.m. of Cl₂ to suppress the growth of *Pseudomonas aeruginosa*. The principles of laboratory animal care as promulgated by The National Society for Medical Research were observed.

Mortality was tabulated for a 30-day period. Under these conditions, approximately 800 R of X and 1000 R of ⁶⁰Co irradiation were equally lethal, all control animals dying between the 10th and 21st days following exposure.

The following table gives the results of the antiradiation evaluation of the compounds synthesized as illustrations of this invention.

ANTIRADIATION EVALUATION [1]

| Example | Compound | Toxicity, ALD₅₀ [2] | Administration method [3] | Time interval, [4] minutes | Dose, [5] mg./kg. | Survival rate, [6] percent |
|---|---|---|---|---|---|---|
| 1 |  NHC(=NH₂⁺)(CH₂S₂O₃⁻) | I.P., 56 | I.P. | 30 | 18 | 20 |
|  |  |  |  | 30 | 36 | 87 |
|  |  |  |  | 60 | 36 | 67 |
|  |  | P.O., 250 | P.O. | 30 | 100 | 0 |
|  |  |  |  | 30 | 200 | 0 |
|  |  |  |  | 60 | 100 | 0 |
|  |  |  |  | 60 | 200 | 0 |
| 2 |  NHC(=NH₂⁺)CH₂S₂O₃⁻ | I.P., 55 | I.P. | 30 | 15 | 13 |
|  |  |  |  | 30 | 30 | 87 |
|  |  |  |  | 60 | 30 | 80 |
|  |  |  |  | 90 | 30 | 47 |
|  |  | P.O., 150 | P.O. | 30 | 75 | 0 |
|  |  |  |  | 60 | 75 | 0 |

See footnotes at end of table.

TABLE—Continued
ANTIRADIATION EVALUATION [1]

| Example | Compound | Toxicity, $ALD_{50}$[2] | Administration method [3] | Time interval,[4] minutes | Dose,[5] mg./kg. | Survival rate,[6] percent |
|---|---|---|---|---|---|---|
| 3 |  CH₃, CH₃, CH₃, NHC(=NH₂⁺)(CH₂S₂O₃⁻) | I.P., 31 | I.P. | 15<br>15<br>30<br>60<br>90<br>120 | 7.5<br>15<br>15<br>15<br>15<br>15 | 87<br>93<br>100<br>80<br>0<br>0 |
|  |  | P.O., 470 | P.O. | 30<br>30<br>30<br>30<br>30<br>60<br>60<br>60<br>60<br>60 | 75<br>100<br>200<br>200<br>300<br>75<br>100<br>200<br>200<br>300 | 47<br>60<br>0<br>([7])<br>([7])<br>33<br>33<br>53<br>([7])<br>([7]) |
| 4 |  CH₂—NHC(=NH₂⁺)CH₂S₂O₃⁻ | I.P., 44 | I.P. | 15<br>15<br>21<br>21<br>30<br>60<br>60 | 10<br>20<br>5<br>10<br>20<br>10<br>20 | 67<br>67<br>0<br>20<br>73<br>0<br>40 |
|  |  | P.O., 140 | P.O. | 30<br>60 | 60<br>60 | 40<br>40 |
| 5 |  CH₃, CH₃, CH₂—NHC(=NH₂⁺)CH₂S₂O₃⁻ | I.P., 63 | I.P. | 30<br>30<br>30<br>30<br>60<br>60<br>90<br>90<br>120<br>150 | 4<br>8<br>15<br>30<br>20<br>30<br>20<br>30<br>20<br>20 | 0<br>67<br>73<br>73<br>67<br>[7]27<br>40<br>[7]53<br>53<br>27 |
|  |  | P.O., 380 | P.O. | 30<br>60<br>90<br>120 | 200<br>200<br>200<br>200 | 7<br>20<br>0<br>7 |
| 6 | 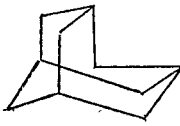 CH₂—NHC(=NH₂⁺)CH₂S₂O₃⁻ | I.P., 25 | I.P. | 30<br>30 | 5<br>10 | 47<br>93 |
|  |  | P.O., >300 | P.O. | 30<br>60<br>30<br>60 | 300<br>300<br>200<br>200 | 0<br>13<br>0<br>0 |
| 7 | 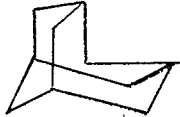 CH₂—NHC(=NH₂⁺)CH₂SH, Cl⁻ | I.P., 22 | I.P. | 15<br>15<br>15<br>15<br>30<br>60 | 1.5<br>3<br>6<br>12<br>12<br>12 | 0<br>33<br>67<br>93<br>80<br>73 |
|  |  | P.O., 65 | P.O. | 15<br>15<br>30<br>30<br>60<br>90 | 15<br>30<br>15<br>30<br>30<br>30 | 75<br>93<br>92<br>93<br>67<br>33 |

[1] Irradiation of mice done with standard dose of 950 roentgen of gamma rays from ⁶⁰Co source, dose rate 100-150 roentgen/minute.
[2] $ALD_{50}$=Approximate lethal dose, 50%.
[3] I.P.=intraperitoneal administration; P.O.=oral administration.
[4] Administration of compound prior to irradiation.
[5] Dose in milligrams of compound per kilogram of mouse body weight.
[6] Survival rate based on a 30-day observation period.
[7] Toxic.

The evaluation results reported in the preceding table show antiradiation utility is possessed by the compounds synthesized as examples of this invention. As the table reveals, some of the example compounds are active when administered intraperitoneally but not when administered orally, while other example compounds are active when administered by either mode.

The evaluation results reported in the preceding table also demonstrate the functional equivalence which exists between the thiosulfuric acid form of the compounds and the hydrolysis products thereof which are compounds of the mercapto form. For instance, S-[N-(1-adamantylmethyl)carboxamidinomethyl] thiosulfuric acid (Example 6, above) is an active antiradiation compound and its hydrolysis product, N-(1-adamantylmethyl)-alpha-mercaptoacetamidine hydrochloride (Example 7, above) is also an active antiradiation compound. Hence, the antiradiation evaluation results demonstrate the equivalence of the thiosulfuric acid form of the compounds and their hydrolysis products which are mercapto compounds.

I claim:
1. N-(1-adamantylmethyl) - alpha - mercaptoacetamidone hydrochloride.

References Cited

R. Barton et al., Canadian Journal of Chemistry, vol. 47, pp. 1233-37 (April 1969).

BERNARD HELFIN, Primary Examiner
G. A. SCHWARTZ, Assistant Examiner

U.S. Cl. X.R.

260—453 R; 424—326, 303